US012249790B2

(12) United States Patent
Benzin

(10) Patent No.: US 12,249,790 B2
(45) Date of Patent: Mar. 11, 2025

(54) PLUG-IN CONNECTOR ELEMENT WITH LOCKING DEVICE

(71) Applicant: HARTING Electric Stiftung & Co. KG, Espelkamp (DE)

(72) Inventor: Marian Benzin, Hille (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 339 days.

(21) Appl. No.: 17/759,883

(22) PCT Filed: Nov. 17, 2020

(86) PCT No.: PCT/EP2020/082398
§ 371 (c)(1),
(2) Date: Aug. 1, 2022

(87) PCT Pub. No.: WO2021/170266
PCT Pub. Date: Sep. 2, 2021

(65) Prior Publication Data

US 2023/0070142 A1 Mar. 9, 2023

(30) Foreign Application Priority Data

Feb. 26, 2020 (DE) ..................... 10 2020 105 041.0

(51) Int. Cl.
*H01R 13/627* (2006.01)

(52) U.S. Cl.
CPC ................................ *H01R 13/6275* (2013.01)

(58) Field of Classification Search
CPC ............ H01R 13/6275; H01R 13/6277; H01R 13/629
See application file for complete search history.

(56) References Cited

U.S. PATENT DOCUMENTS

| | | | |
|---|---|---|---|
| 2015/0303620 | A1 | 10/2015 | Friesen |
| 2019/0319403 | A1 | 10/2019 | Friesen |

FOREIGN PATENT DOCUMENTS

| | | | |
|---|---|---|---|
| CN | 103606783 | A | 2/2014 |
| CN | 105186197 | A | 12/2015 |
| DE | 102012111408 | | 10/2013 |
| DE | 102015015202 | A1 | 5/2017 |
| DE | 102016111458 | A1 | 12/2017 |
| EP | 3742561 | | 11/2020 |
| JP | H0557775 | A | 3/1993 |

*Primary Examiner* — Briggitte R. Hammond
(74) *Attorney, Agent, or Firm* — Smartpat PLC

(57) ABSTRACT

A plug-in connector element with a locking device (14) for releasably locking on a plug partner (12), wherein the locking device has a plurality of locking hooks (16, 18) which are distributed on the circumference of a main body (10) and which are detented at a front end in the plug-in direction and are pivotable in a radial direction between a locking position and a release position, characterized in that the locking hooks (16, 18) are designed as structural parts which are separated from each other and from the main body (10) and which are mounted on the main body such that they are each tiltable about an axis running at right angles to the insertion direction and at right angles to the radial direction, and which, at the end opposite the detent, are each supported resiliently on the main body in the axial direction.

9 Claims, 5 Drawing Sheets

PLUG-IN CONNECTOR ELEMENT WITH LOCKING DEVICE

TECHNICAL FIELD

The disclosure relates to a plug-in connector element with a locking device for detachable locking to a plug partner, wherein the locking device has a plurality of locking hooks which are distributed over the periphery of a base body, are each detented at a front end in the plugging direction, and can pivot in a radial direction between a locking position and a release position. In particular, the disclosure concerns electrical plug-in connector elements.

BACKGROUND

The term "locking" is here to be understood in a general sense and is intended to include both positive locking and non-positive locking, as well as latching.

In the case of electrical plug-in connectors, it is intended that the locking device prevents the connection from becoming detached unintentionally, for example by pulling on the cable. In the locking position, the locking hooks engage behind an undercut or in a latching recess of the plug partner such that at least a certain resistance opposes relative movement in the detaching direction.

In the case of the usual plug-in connectors, in particular in the case of compact electrical plug-in connectors, the locking hooks are designed as resilient tongues which can pivot in the radial direction by virtue of their inherent elasticity. The tongues can be formed directly on the base body or they can be formed integrally on a sleeve which surrounds the base body and for its part is held axially fixed on the base body.

A distinction is made between internal locks, in which the base body is plugged into a plug partner and the locking hooks are bent outward at right angles, and external locks, in which the base body is plugged onto the plug partner and the locking hooks are bent inward at right angles. In the case of electrical plug-in connectors, the locking devices are often designed as push-pull mechanisms in which the lock automatically latches into place when the plug-in connection is produced and unlocking is effected by an actuating element, for example in the form of a sleeve, being pulled backward in a detaching direction.

Plug-in connectors are also known in which the locking device has a threaded part which can be screwed to a mating thread of the plug partner. The thread and the mating thread can here be formed just in some sectors such that the threaded parts can be plugged axially into each other in a position in which the thread sectors are twisted relative to each other and the threads come into engagement with each other only in the event of subsequent rotation of one threaded part relative to the other. In that case, latching hooks, by means of which provisional locking has already been obtained in the position in which the threaded parts are not yet in engagement with each other, can be provided in the gaps between the threaded sectors.

DE 10 2012 111 408 B3 discloses a locking device for plug-in connectors, in which the locking hooks are designed as rocker levers which can pivot about a pivot point on the base body. The rocker levers are pretensioned into the locking position such that elongated arms of the pivot levers, which project beyond the pivot bearing counter to the plugging direction, are pulled inward by a spring ring.

SUMMARY

An object of the disclosure is to provide a plug-in connector in which the locking device has a lower structural length.

This object is achieved in that the locking hooks are designed as components which are separate from one another and from the base body and are mounted on the base body such that they can each be tilted about an axis extending at right angles to the plug-in direction and at right angles to the radial direction, and which are each supported in the axial direction resiliently on the base body at the end opposite the detent.

The radial pivoting movement of the locking hooks between the locking position and the release position is not, or at least not solely, enabled by the inherent elasticity of the locking hooks and instead because the locking hook as a whole rotates about its tilting axis. Not only does this make it possible to reduce the length of the locking hooks but it also has the advantage that there is a reduced risk of fatigue fractures and hence the durability of the locking device is improved because there is no or at most just a small elastic deformation. Because the locking hooks are supported in the axial direction resiliently on the base body, the axial position of the tilting axis does not need to be fixed such that an axial translational movement of the locking hook can be superposed with the tilting movement. The locking hooks are then mounted on the base body in an, as it were, "floating" fashion. The locking hooks can be pretensioned into the locking position or selectively also into the release position by virtue of the resilient support, whether by the locking hook being pretensioned axially against a ramp which slopes upward or downward in the radial direction or by the axial spring force, together with a stop or support point for the locking hook, generating a torque.

Advantageous embodiments are described in the dependent claims.

In an embodiment, each locking hook has a radial projection, on which the axial spring force engages, at the end opposite the detent. This spring force can be generated by spring elements which are formed directly on this radial projection and are supported on a shoulder of the base body. For example, the spring elements can be designed as wings which extend circumferentially from the opposite sides of the radial projection.

In an embodiment, only every second locking hook has such resilient wings, whilst the locking hooks arranged in between have, instead of the wings, rigid support arms which overlap circumferentially with the radial projections of the spring-loaded locking hooks such that the resilient support is effected indirectly via the resilient wings of the adjacent locking hooks. By virtue of this structure, the resilient wings can also have a relatively large length circumferentially even in the case of compact plug-in connectors, as a result of which the elastic stress and hence the risk of fatigue fractures is reduced.

BRIEF DESCRIPTION OF THE DRAWINGS

Exemplary embodiments of the invention are explained in detail below with the aid of the drawings, in which.

DETAILED DESCRIPTION

Figure 1:
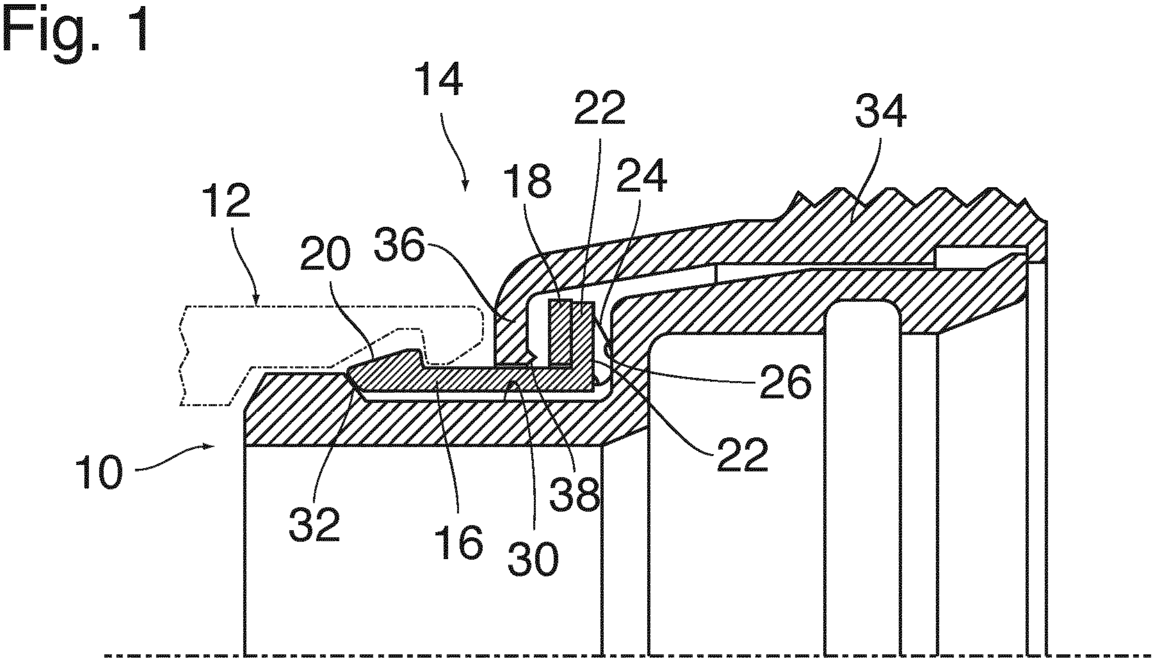
FIG. 1 shows an axial section through a circumferential region of a plug-in connector.

Part of a circumferential wall of a plug-in connector is shown in an axial section in FIG. 1. The plug-in connector has a sleeve-like base body 10 which can be plugged into a plug-in opening of a plug partner 12 (indicated here only in dot-dash lines) and can be locked to the plug partner by means of a locking device 14. The locking device has a plurality of locking hooks 16, 18 which are distributed over the circumference of the base body and are illustrated separately in FIGS. 2 and 3. Each locking hook has, at its front end in the plugging direction (to the left in FIG. 1), a radially outward facing detent 20 which is formed here as a latching lug and engages in a latching recess of the plug partner 12 in the locking position shown in FIG. 1. Each locking hook has a radially outward facing projection 22 at the rear end.

Figure 2:
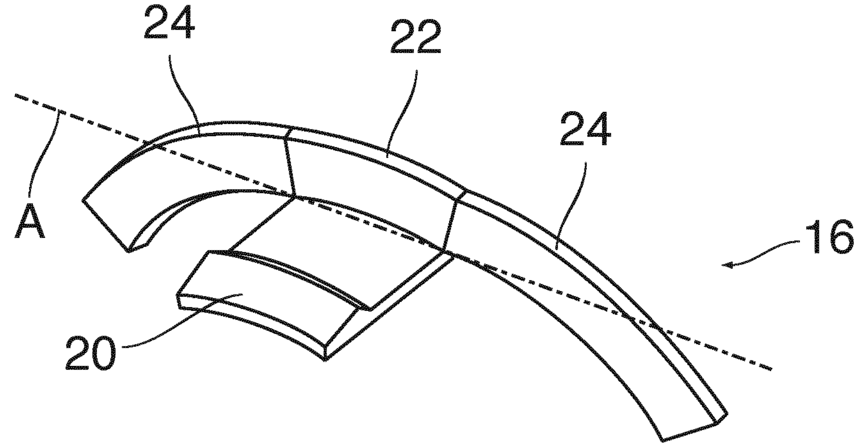
FIGS. 2 and 3 show perspective views of differently configured locking hooks.

In the case of the locking hook 16 shown in FIG. 2, two resilient wings 24, which extend in arcs of a circle in the circumferential direction of the base body 10, adjoin the sides of the projection 22. The wings 24 are slightly angled with respect to the projection 22 and slightly curved over their length such that they are supported resiliently on a shoulder 26 of the base body 10.

Figure 3:
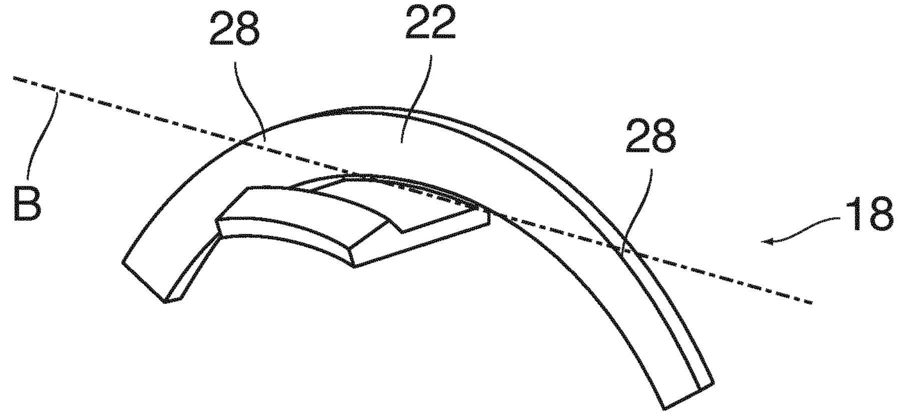

The locking hook 18 shown in FIG. 3 has two rigid support arms 28, which lie in the same plane as the projection 22, instead of the wings 24.

Figure 4:
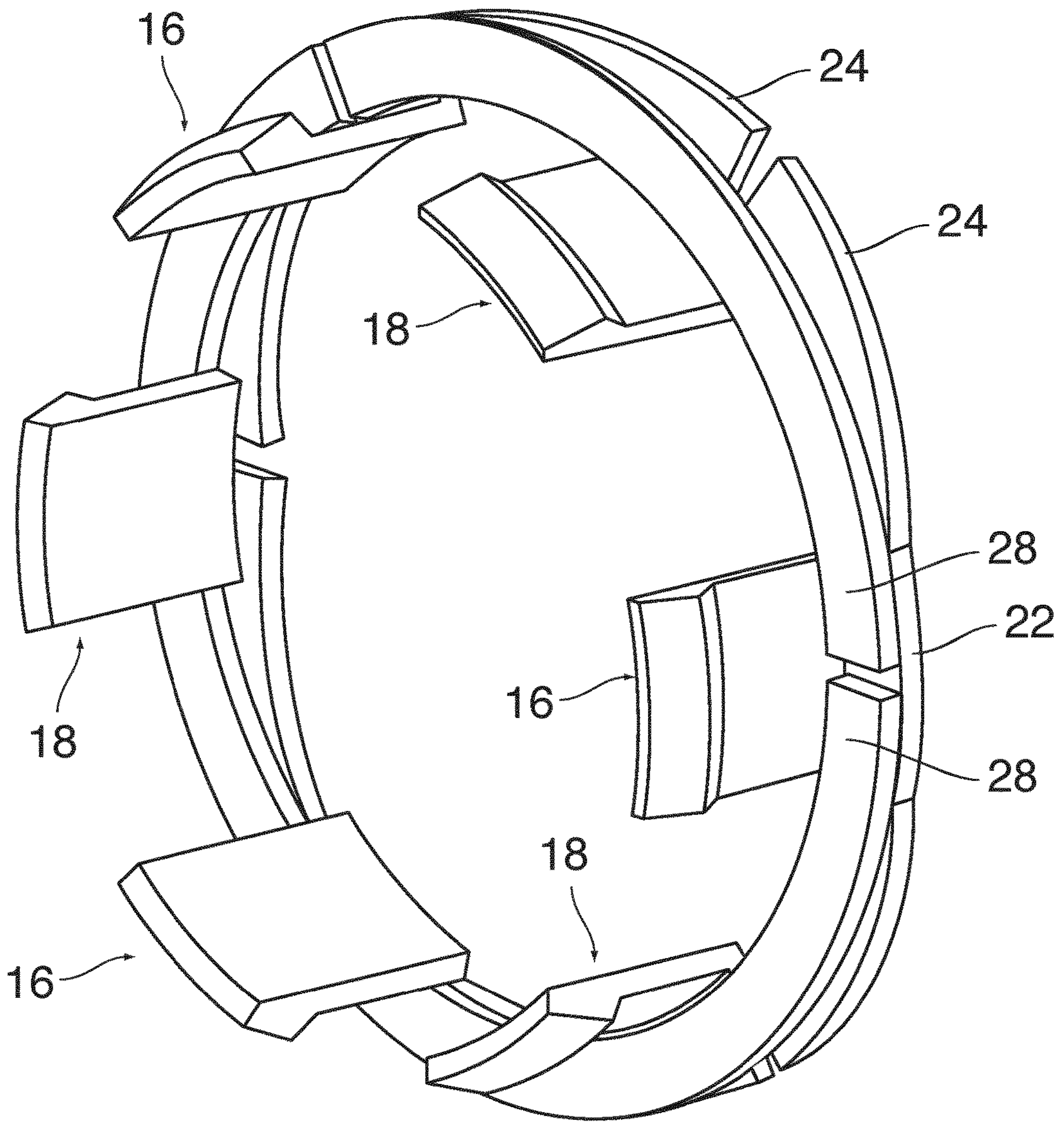
FIG. 4 shows a perspective view of the locking hooks according to FIGS. 2 and 3 in their mounted position.

A total of six locking hooks are shown in FIG. 4 in the configuration in which they are arranged on the base body 10. The three locking hooks 16 are arranged at angular spacings of 120°. The wings 24 each extend over an arc angle of nearly 60° such that the free ends of the wings of two adjacent hooks almost touch each other. The locking hooks 18 are likewise arranged at angular spacings of 120° in gaps between the locking hooks 16, and also the support arms 28 each extend over an arc angle of approximately 60° such that they overlap the projections 22 of the two adjacent locking hooks 16. The locking hooks 16 are pretensioned forward in the plugging direction by the resilient wings 24. Their projections 22 thus press against the ends of the support arms 28, as a result of which the locking hooks 18 are also pretensioned in the same direction.

As can be seen in FIG. 1, the locking hook 16 is guided with its radially inner (lower in FIG. 1) part in an axial groove 30 of the base body 10. The wings 24 lie outside this groove 30 and are supported on the circumference of the base body 10 at the locations at which they are placed on the projection 22 such that the locking hook is held at the rear end at a distance from the base of the groove 30. The same applies analogously also for the locking hooks 18 provided with the support arms 28.

Tilting axes A and B, about which the locking hooks can pivot, are indicated in FIGS. 2 and 3. These tilting axes extend at right angles to the plugging direction through support points at which the wings 24 or the support arms 28 lie on the edge of the groove 30.

Each groove 30 is delimited at the front end by an obliquely upward sloping ramp 32 at which the front end of the locking hook is supported such that the locking hook is also held at the front end at a distance from the base of the groove 30. In the locking position according to FIG. 1, the ramp 32 at the same time prevents the detent 20 from escaping from the latching recess of the plug partner 12.

Figure 5:
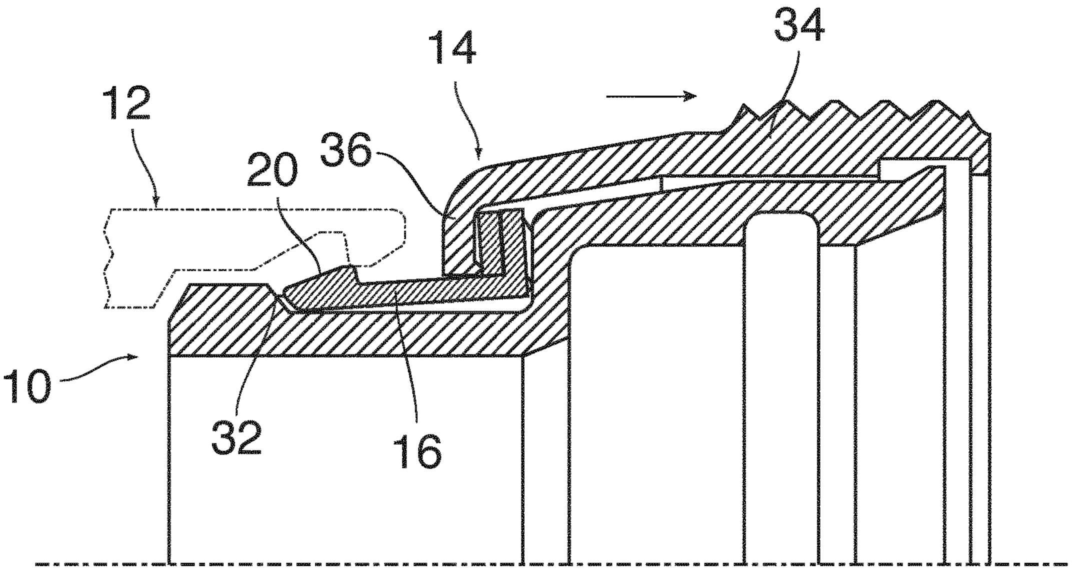
FIGS. 5 and 6 show illustrations in section, similar to FIG. 1, for different states of a locking device.

Arranged on a part of the base body 10 which is delimited by the shoulder 24 and has a widened diameter is a detaching element 34 which is designed in this example as a sleeve which surrounds the base body 10 and is guided axially displaceably on this base body. The detaching element 34 has at the front end a radially inward facing flange 36 which engages over the projections 22 of the locking hooks 16, 18. In FIG. 1, the detaching element 34 is situated in a front end position in which the flange 36 has an axial distance from the projection of the locking hook 18. The detaching element 34 can be held elastically in this end position, for example, by a spring which is not shown. In this example, the flange 36 has, on the inner edge on the side facing the projections 22, a lug 38 which engages on the inner edge of the projections 22 and the support arms 28 of the locking hooks 18 when the detaching element 34 is pulled back axially counter to the spring force. Because the locations at which the wings 24 are placed against the projection 22 are offset slightly radially outward relative to the lug 38, a torque which tends to tilt the locking hooks counterclockwise in FIG. 1 acts on the juxtaposed projections 22 of the locking hooks 16 and 18. At the same time, all the locking hooks 16 and 18 are pulled back uniformly by the axial movement of the detaching element 34 such that their free ends slide along the ramps 32 and enter deeper into the groove 30, whilst the detent 20 escapes from the latching recess of the plug partner 12. In this way, the locking hooks 16, 18 are transferred into a release position shown in FIG. 5 in which the locking is canceled. If the user continues to pull on the detaching element 34, the plug-in connector element is thus pulled out of the plug-in opening of the plug partner 12.

Figure 6:
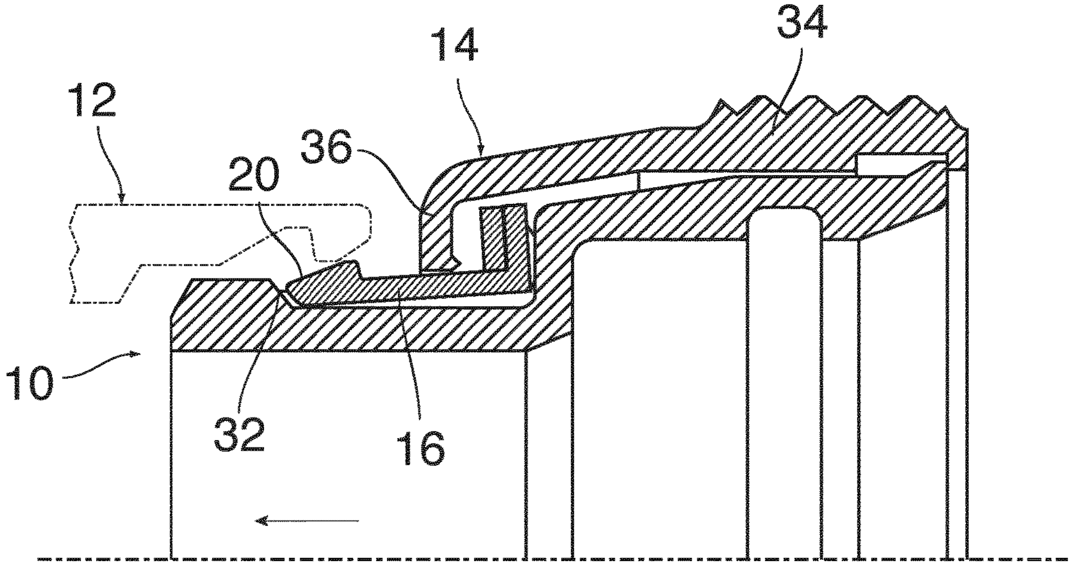

FIG. 6 shows the state in which the plug-in connection is reproduced by the base body 10 being pushed into the plug-in opening of the plug partner 12. The beveled front flanks of the detents 20 here run up a run-in slope of the plug partner 12, as a result of which the locking hooks 16, 18 are pushed back counter to the force of the resilient wings 24 and the free ends of the locking hooks slide again along the ramps 32 and the locking hooks are tilted again into the release position such that the base body 10 and the locking hooks can be inserted deeper into the plug-in opening. When the detent 20 reaches the axial position of the latching recess of the plug partner 12, the front ends of the locking hooks 16, 18 run up the ramps 32 under the force of the resilient wings 24 and into the locking hooks pivot into the locking position according to FIG. 1.

In another embodiment, the tilting movement of the locking hooks 16, 18 into the release position can also be controlled or assisted by the rear flank of the detent 20 and the corresponding mating surface of the latching recess being beveled to a greater degree such that, when the locking hooks are pulled back, these angled surfaces slide along each other and are pressed more deeply into the groove 30.

The locking hooks 16, 18 with the form illustrated in FIGS. 2 and 3 can be produced optionally from plastic or from sheet metal. In the case of production from sheet metal, a flat blank can first be stamped out, in which the projection 22 and the wings 24 or the support arms 28 lie in the same plane as the remainder of the locking hook. In a further step, the projection 22 with the wings or support arms are then folded at right angles. The detent 20 can, for example, be produced by the free end of the locking hook being upset axially in a suitable press mold.

In the arrangement of the locking hooks 16, 18 shown in FIG. 4, the wings 24 have a very great length in comparison with the spring travel which the locking hooks have to cover such that the wings experience only a small amount of elastic deformation and virtually no material fatigue occurs even when a very high number of locking and unlocking actions are made.

In a different embodiment, in particular in the case of a relatively large diameter of the base body 10, all the locking hooks can also have the shape which is shown in FIG. 2 for the locking hooks 16. In that case, the locking hooks are arranged such that their projections 22 all lie in a common plane and all the locking hooks are supported directly on the shoulder 26 via the wings 24.

Figure 7:
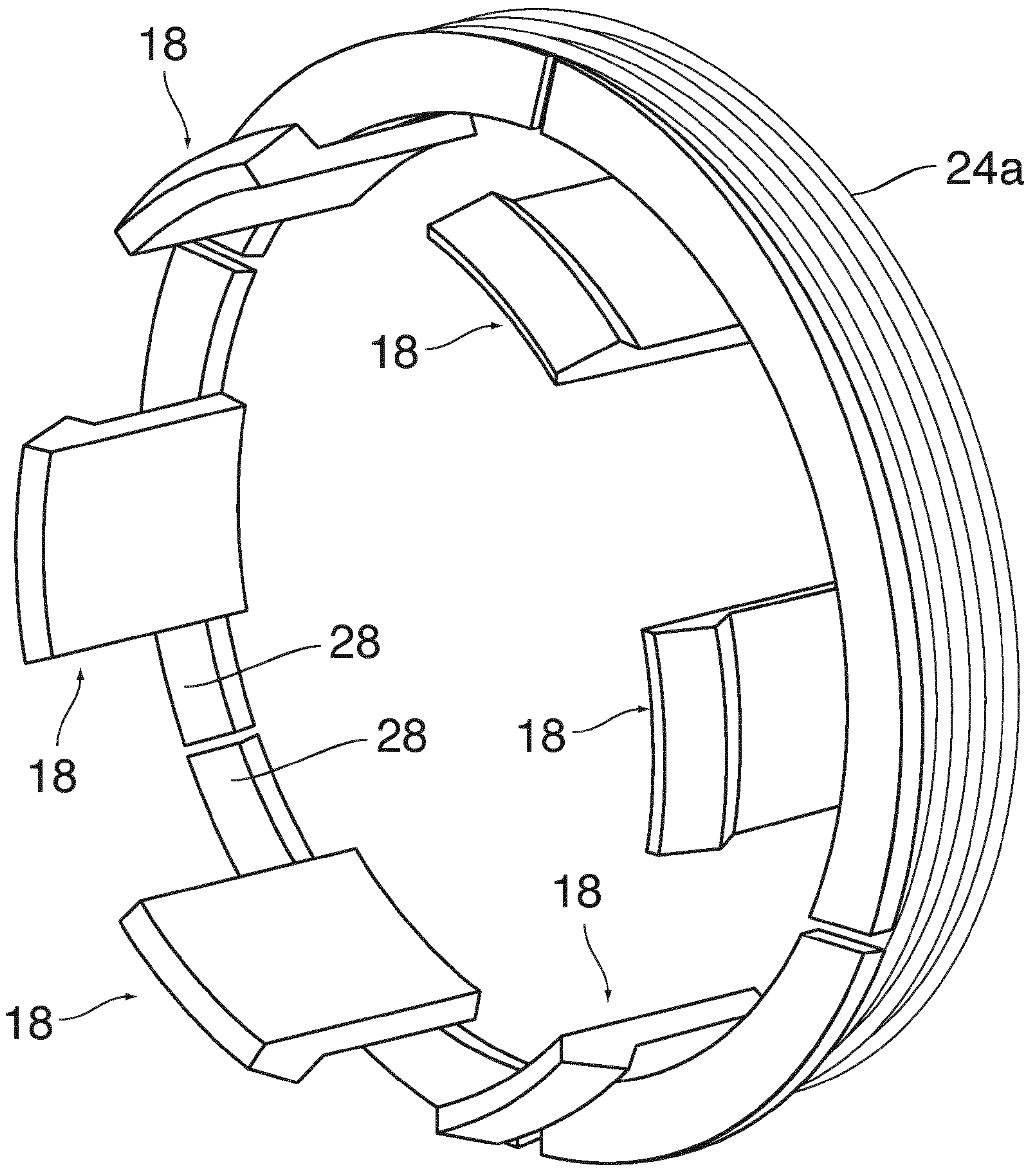
FIG. 7 shows an illustration, similar to FIG. 4, for a modified embodiment.

FIG. 7 shows a further variant in which all the locking hooks 18 are formed as in FIG. 3 and the resilient support is effected by means of a helical spring 24*a*, only indicated in the drawings, which surrounds the reduced-diameter part of the base body and is supported on the shoulder 26 (not shown here).

Figure 8:
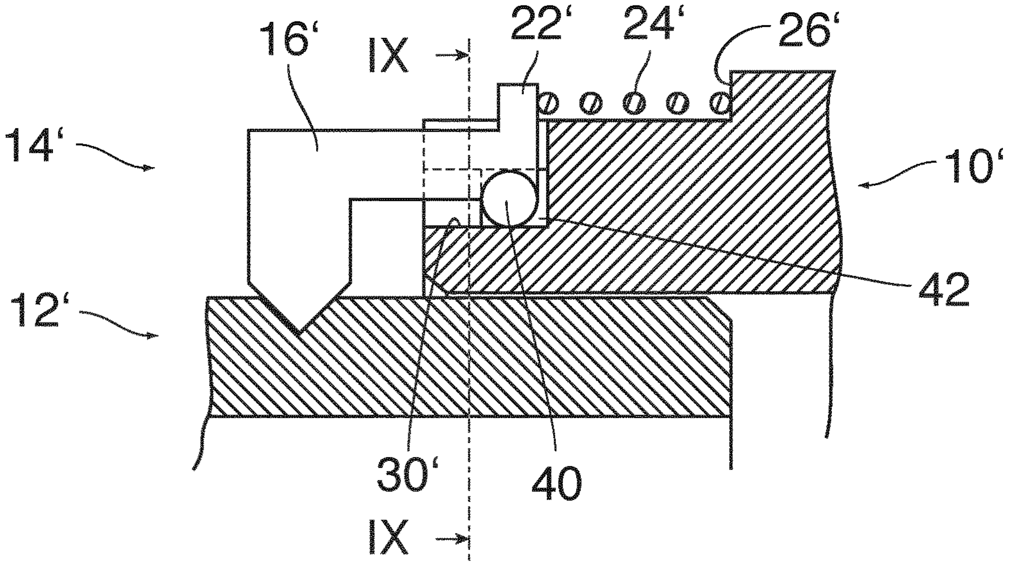
FIG. 8 shows an axial section through the circumferential region of a plug-in connector with a locking device according to a different exemplary embodiment.
Figure 9:
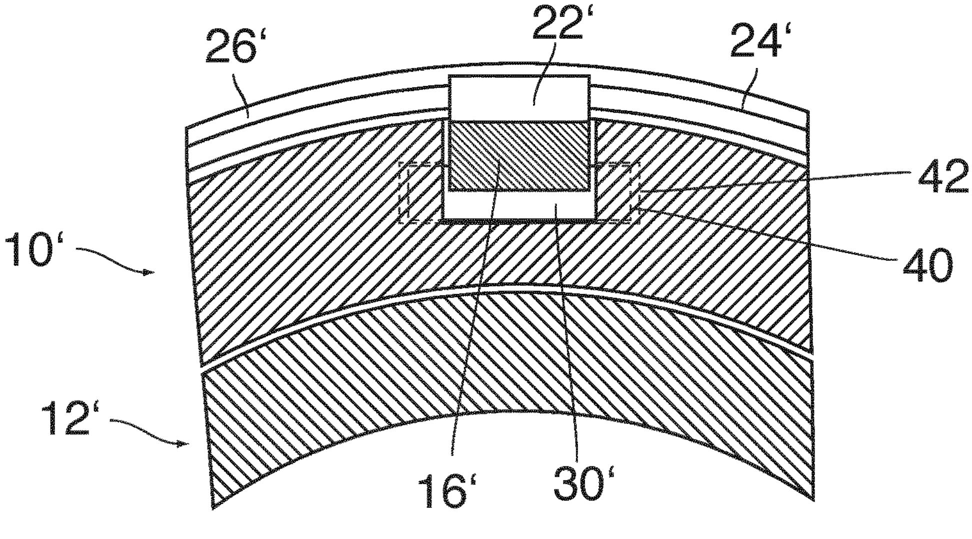
FIG. 9 shows a section along the line IX-IX in FIG. 8.
Figure 10:
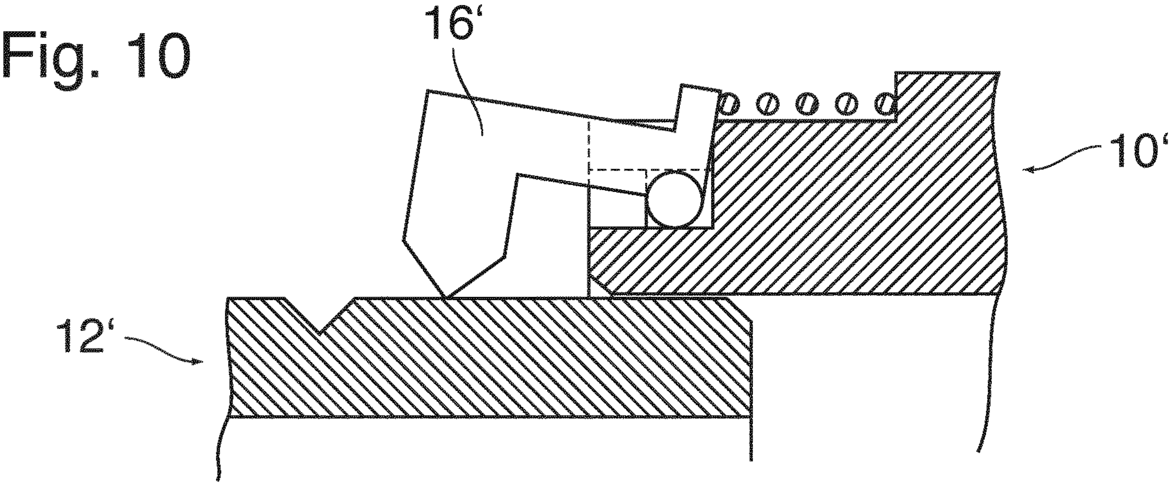
FIG. 10 shows the locking device according to FIG. 8 in the unlocked state.

FIGS. 8 to 10 show an example for a locking device 14' on a plug-in connector element with a different structure. This plug-in connector element has a sleeve-like base body 10' which can be plugged onto a plug partner 12' formed as a pin. The locking device 14 is accordingly formed as an external locking means, with locking hooks 16' which engage from outside in corresponding latching recesses of the plug partner 12'.

The locking hooks 16' each have at the rear end a radial projection 22' on which a helical spring 24' surrounding the base body 10' engages and which is supported at its opposite end on a shoulder 26' of the base body. The rear part of each locking hook 16' is received in an axial groove 30' of the base body. At the rear end, the locking hook has two laterally projecting axle stubs 40 which each engage in a pocket 42 formed in the flank of the groove 30'. In this way, a pivot bearing for the locking hook 16' is formed and at the same time the locking hook is fixed both in the radial and in the axial direction. The helical spring 24' exerts a torque on the locking hook by means of which the latter is held elastically in the engaged position shown in FIG. 8.

In this embodiment, the plug-in connector element is locked to the plug partner 12' exclusively by latching. If the base body 10' is pulled off from the plug partner 12 with sufficiently high force, the locking hook is pressed out of the V-shaped latching recess of the plug partner 12, wherein the helical spring 24' yields, as shown in FIG. 10.

The invention claimed is:

1. A plug-in connector element with a locking device (14; 14') for detachable locking to a plug partner (12; 12'),
wherein the locking device has a plurality of locking hooks (16, 18; 16') which are distributed over a circumference of a base body (10; 10'),
have a detent at a front end in a plugging direction, and can pivot in a radial direction between a locking position and a release position,
wherein the locking hooks (16, 18; 16') are designed as components
which are separate from one another and from the base body (10; 10') and are mounted on the base body such that they can each be tilted about an axis (A; B) extending at right angles to the plugging direction and at right angles to the radial direction, and
which are each supported in an axial direction resiliently on the base body at an end opposite the detent,
wherein the locking hooks (16) are supported on the base body (10) by elastic wings (24), and
wherein the elastic wings (24) are formed as a single piece with the locking hooks.

2. The plug-in connector element as claimed in claim 1, wherein the locking hooks (16, 18; 16') each have a radial projection (22; 22') at a rear end in the plugging direction.

3. The plug-in connector element as claimed in claim 2, wherein the locking hooks (16, 18; 18') are each guided in an axial groove (30; 30') of the base body.

4. The plug-in connector element as claimed in claim 1, wherein the base body (10) for each locking hook has a ramp (32) against which the front end of the locking hook is pretensioned by an elastic support and which is involved in controlling the tilting movement of the locking hook.

5. The plug-in connector element as claimed in claim 3, wherein the wings (24) are placed on the radial projection (22) of the locking hook (16) and extend outside the groove (30) of the base body over part of the circumference of the base body.

6. The plug-in connector element as claimed in claim 5, wherein the locking hooks (16) alternate circumferentially with further locking hooks (18) which, instead of the wings (24), have rigid support arms (28) lying in a plane of the projection (22),
wherein the rigid support arms (28) are each supported with their free end on the projection (22) of an adjacent one of the locking hooks (16).

7. The plug-in connector element as claimed in claim 2, wherein the locking hooks (18) are supported on a shoulder (26) of the base body with their radial projections (22) via a helical spring (24*a*) which surrounds part of the base body (10).

8. The plug-in connector element as claimed in claim 5, wherein the locking hooks (16, 18) are produced from sheet metal.

9. The plug-in connector element as claimed in claim 1, wherein the locking hooks (16, 18; 16') are produced from plastic.

* * * * *